United States Patent [19]

Kobayashi

[11] Patent Number: 4,573,368
[45] Date of Patent: Mar. 4, 1986

[54] CARRIAGE DRIVING APPARATUS

[75] Inventor: Kazuo Kobayashi, Furukawa, Japan

[73] Assignee: Alps Electric Co., Ltd., Tokyo, Japan

[21] Appl. No.: 604,960

[22] Filed: Apr. 27, 1984

[30] Foreign Application Priority Data

Apr. 27, 1983 [JP] Japan ................. 58-62136[U]

[51] Int. Cl.$^4$ ............. F16C 1/10; F16H 21/44; F16H 21/54; F16H 25/18
[52] U.S. Cl. ................... 74/108; 474/138; 346/139 A
[58] Field of Search ........... 74/108; 474/136, 138; 346/139 A; 358/293

[56] References Cited

U.S. PATENT DOCUMENTS

| 916,619 | 3/1909 | Shafer | 474/136 |
| 2,884,788 | 5/1959 | Clark | 74/409 |
| 3,832,910 | 9/1974 | Bryant | 474/136 |
| 4,198,871 | 4/1980 | Dunn et al. | 74/37 |
| 4,419,707 | 12/1983 | Woodier | 74/108 |

Primary Examiner—Larry I. Schwartz
Assistant Examiner—David W. Westphal
Attorney, Agent, or Firm—Guy W. Shoup

[57] ABSTRACT

A carriage for use in disc driving or the like can be driven correctly by a carriage driving apparatus comprising guide shafts extended linearly, a carriage slidably supported on the guide shafts, a pulley holder rotatably supported around one of the guide shafts at one end thereof, a driven pulley rotatably journaled at one side of the pulley holder, a drive pulley disposed at a predetermined distance from the driven pulley and connected to a rotational shaft of a driving motor, a pulling belt laid around between the drive pulley and the driven pulley and connected at an intermediate portion thereof to the carriage and a base for supporting the guide shafts, wherein a pulley holder rotation inhibitive portion is disposed on the opposite side of a mounting portion for the driven pulley with respect to the guide shaft support portion of the pulley holder closely opposing to the base.

6 Claims, 2 Drawing Figures

CARRIAGE DRIVING APPARATUS

BACKGROUND OF THE INVENTION

This invention concerns a driving apparatus for a carriage for use in a disc driving apparatus or the like.

SUMMARY OF THE INVENTION

The object of this invention is to provide a carriage driving apparatus capable of correctly transferring a carriage.

The above object can be attained according to this invention by a carriage driving apparatus comprising guide shafts extended linearly, a carriage slidably supported on the guide shafts, a pulley holder rotatably supported around one of the guide shafts at one end thereof, a driven pulley rotatably journaled at one side of the pulley holder, a drive pulley disposed at a predetermined distance from the driven pulley and connected to a rotational shaft of a driving motor, a pulling belt laid around between the drive pulley and the driven pulley and connected at an intermediate portion thereof to the carriage and a base for supporting the guide shafts, wherein a pulley holder rotation inhibitive portion is disposed on the opposite side of a mounting portion for the driving pulley with respect to the guide shaft support portion of the pulley holder while opposing to the base.

BRIEF DESCRIPTION OF THE ACCOMPANYING DRAWINGS

This invention is to be described in more details referring to the accompanying drawings by which the foregoing and other objects, as well as the features of this invention will be made clearer in which;

FIG. 1 is a plan view for a carriage driving apparatus according to this invention; and FIG. 2 is an enlarged cross sectional view taken along line A—A' in FIG. 1.

DESCRIPTION OF THE PREFERRED EMBODIMENT

Figure 1:
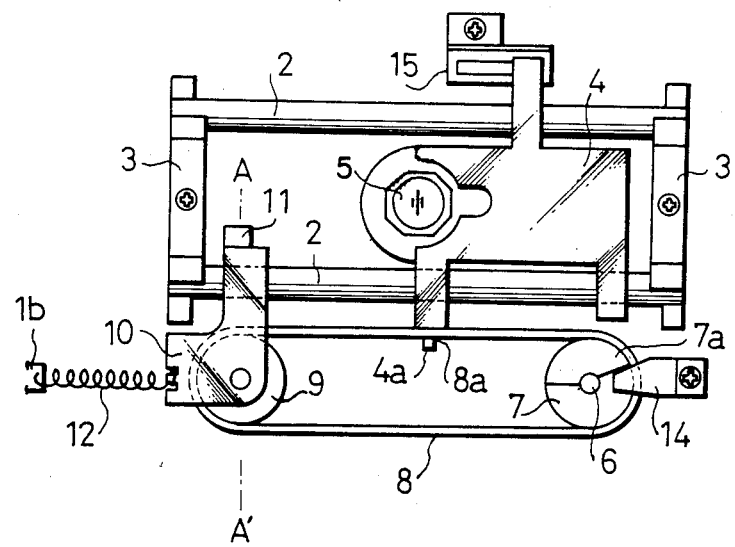
Figure 2:
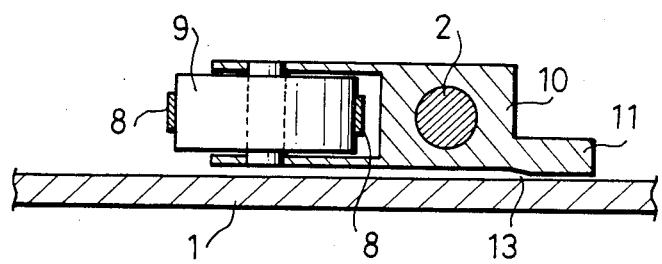

In FIGS. 1 and 2, a chassis 1 has a pair of guide shafts 2, 2 secured thereto in parallel by means of retainer plates 3, 3, and a carriage 4 is slidably supported on the guide shafts 2, 2. A magnetic head 5 for writing and reading to and from a flexible magnetic disc (not shown) is secured to the carriage 4.

At the rearface of the chassis 1, is secured a driving motor (not shown), the rotational shaft 6 of which was securely fitted with a drive pulley 7. A belt 8 made of a thin metal sheet is wound around the drive pulley 7 and set to the pulley 7 by means of a threaded screw (not shown). The belt 8 is also laid around a driven pulley 9 which is rotatably supported on one side of a pulley holder 10. The pulley holder 10 is rotatably journaled at its one end to the guide shaft 2, and a pulley holder rotation inhibitive portion 11 is disposed on the opposite side to the mounting portion for the driven pulley with respect to the guide shaft support portion. The pulley holder rotation inhibitive portion 11 is located as close as possible to the surface of the chassis 1 as shown in FIG. 2.

A spring 12 extends between the pulley holder 10 and the mounting portion 1b of the chassis 1, so that the endless belt 8 laid between the drive pulley 7 and the drive pulley 9 may always be applied with a tension and not slackened. A slight gap 13 is formed between the pulley holder rotation inhibitive portion 11 and the chassis 1 as shown in FIG. 2 so that the function of the spring may not be hindered. The belt 8 is formed with an aperture through which the projection 4a disposed from the carriage 4 is inserted to connect the carriage 4 with the belt 8, whereby the carriage 4 moves following the running of the belt 8. A cam protrusion 7a formed on the upper surface of the drive pulley 7 can be abutted against a stopper member 14 for preventing the carriage 4 from uncontrolled running. A microswitch 15 actuated by the movement of the carriage 4 is disposed along the passage of the carriage.

Referring then to the driving operation of the carriage 4 constituted as described above, the carriage 4 secured with a head 5 is slidable being guided along the guide shafts 2, 2 and driven by the belt 8 laid around the drive pulley 7 and the drive pulley 9. The drive pulley 7 is securely fitted with the rotational shaft 6 of the driving motor. As the driving motor rotates, the belt 8 secured to the drive pulley 7 moves and the carriage 4 is transferred together with the belt 8 in the direction of tracking a magnetic disc. Since the driving pulley 9 is freely journaled on the pulley holder 10 and the belt 8 is always supplied with the tension from the spring 13, the carriage 4 can accurately be transferred. Furthermore, since the pulley holder 10 is supported on the guide shaft 2, it may possibly be rotated about the guide shaft 2 as the axial center due to the vibrations caused upon transfer of the carriage 4 or the like. However, since the pulley holder 10 is inhibited by the pulley holder rotation inhibitive portion 11 from excess rotation, no positional displacement is caused to the belt 8 wound around the driven pulley 9. Consequently, the carriage 4 driven by the belt 8 can always be transferred smoothly along the guide shafts 2, 2 in the direction of tracking the magnetic disc. When the carriage 4 arrives at a zero track position, the microswitch 15 is actuated to stop the transfer of the carriage 4.

In this invention, the pulley holder rotation inhibitive portion is disposed on the opposite side to the mounting portion for the driven pulley with respect to the guide shaft bearing portion of the pulley holder while opposing to the base. Accordingly, if a force tending to rotate the pulley holder around the guide shaft is exerted during transfer of the carriage or the like, the rotation of the pulley holder can be inhibited by the pulley holder rotation inhibitive portion to always stretch the belt at an exact position between the drive pulley and the driven pulley, whereby the carriage can be transferred by a predetermined amount to conduct the correct tracking for the magnetic disc.

What is claimed is:

1. A carriage driving apparatus comprising guide shafts extended linearly, a carriage slidably supported on said guide shafts, a pulley holder slidably and rotatably supported around one of said guide shafts at one end thereof, a driven pulley rotatably journaled at one side of said pulley holder, a drive pulley disposed at a predetermined distance from said driven pulley and connected to a rotational shaft of a driving motor, a pulling belt laid around said drive pulley and said driven pulley and connected at an intermediate portion thereof to said carriage, a base for supporting said guide shafts, and a pulley holder rotation inhibitive portion disposed on the opposite side of a mounting portion for said driven pulley with respect to the guide shaft support portion of said pulley holder closely opposing to said base.

2. The carriage driving apparatus as defined in claim 1, wherein the pulley holder is formed into a generally L-shaped configuration.

3. The carriage driving apparatus as defined in claim 1, wherein the belt is composed of an endless belt.

4. The carriage driving apparatus as defined in claim 1, wherein a cam protrusion is formed to the drive pulley for regulating the rotational extent of said drive pulley.

5. The carriage driving apparatus as defined in claim 1, which is used in a disc driving apparatus.

6. The carriage driving apparatus of claim 1, further comprising biasing means for biasing said pulley holder in a direction opposite from the drive pulley to supply tension to said pulling belt.

* * * * *